United States Patent [19]

Mentler

[11] 4,308,577
[45] Dec. 29, 1981

[54] BASE DRIVE CIRCUIT

[75] Inventor: Sandor Mentler, Downingtown, Pa.

[73] Assignee: Burroughs Corporation, Detroit, Mich.

[21] Appl. No.: 146,648

[22] Filed: May 5, 1980

[51] Int. Cl.³ .......................................... H02M 7/537
[52] U.S. Cl. .................................... 363/134; 307/280; 323/289
[58] Field of Search ...................... 307/254, 280, 300; 323/289; 363/22–26, 50, 55, 56, 133, 134

[56] References Cited

U.S. PATENT DOCUMENTS

| | | | |
|---|---|---|---|
| 3,663,941 | 5/1972 | Pasciutti | 363/23 |
| 3,909,695 | 9/1975 | Peck | 363/25 |
| 4,254,459 | 3/1981 | Belson | 363/24 |

Primary Examiner—A. D. Pellinen
Attorney, Agent, or Firm—Mark T. Starr

[57] ABSTRACT

A base drive circuit particularly well adapted for use with bipolar power transistors in high frequency power conversion systems. When utilized in a transformer isolated inverter system, the base drive circuits present a polarity insensitive input impedance which eliminates the effects of cross-conduction between base drive circuits connected to the secondary side of the transformer.

9 Claims, 3 Drawing Figures

BASE DRIVE CIRCUIT

BACKGROUND OF THE INVENTION

The present invention relates in general to the field of high frequency power conversion. More particularly, the present invention relates to a high frequency switch mode type power supply which generates an ac-type waveform by rapidly switching on and off one or more dc voltage sources. Still more particularly, the present invention relates to a base drive circuit which is used to couple turn-on and turn-off signals to a power amplifying device such as a bipolar transistor utilized in the inverter section of a power supply.

Referring now to FIG. 1, those skilled in the prior art will realize that bipolar transistor 10 may be used as an ON-OFF switch to energize the load 12 with voltage source $V_L$. Thus, transistor 10 will be turned on and the load 12 energized whenever base current $I_{B1}$ is forced to flow. In order to quickly de-energize the load 12, it is generally insufficient to set $I_{B1}$ to zero since minority carriers stored in the base region of transistor 10 must recombine before collector current will cease to flow following the interruption of $I_{B1}$. The resulting delay, referred to as storage time, is in general unacceptably long unless the charge stored in the base region of transistor 10 is removed by external means such as a reverse base current $I_{B2}$. Current reversal can be accomplished by reversing the polarity of the bias voltage $V_{BE}$. The use of reverse base-emitter voltage has the further advantages of decreasing the collector current fall time during turn off and allowing the transistor 10 to withstand higher collector-emitter voltages once it is in the OFF state.

In the design of switch mode power supplies, the object is to produce an ac-type waveform which will then be transformed down, rectified and filtered to produce a dc voltage which is typically used to power some logic circuitry. To generate the ac-type waveform, switch mode power supplies often utilize two power switches such that when one switch is turned on the other switch is turned off. One of the switches controls the application of a positive dc voltage to the load while the other switch controls the application of a negative dc voltage, with the result that by operating the switches in a push-pull manner an ac-type voltage is applied to the load.

Bipolar transistors are frequently used as the power switches because of their fast switching speed and ability to handle high voltages and currents. In order to rapidly turn on and off the bases of the bipolar transistors and thus be able to generate a high frequency ac-type voltage, a base drive circuit for coupling control signals into the base of the power switch (i.e., bipolar transistor) while at the same time achieving fast turn off of that power switch is required.

The design of base drive circuits for power inverters is well known in the prior art. Thus, for example, in "Base Drive Considerations in High Power Switching Transistors" by Dennis Roark, TRW Power Semiconductors Application Note No. 120, January, 1975, a circuit to provide transformer isolated base drive which is readily employable in a power inverter is described. When such a base drive circuit is used in an inverter, two of the base drive circuits are conntected to the secondary of an isolation transformer, each to couple one of two switching signals from the primary side of the isolation transformer to one of two power switches respectively, the two power switches energizing one side of the load with either the common or V+ output of a high voltage dc power supply, respectively, the other side of the load being connected to a dc voltage of +V/2, thus applying an ac-type voltage to the load.

A problem with the latter discussed prior art circuit occurs due to the less than perfect characteristics of practical coupling transformers, which can result in both power switching transistors conducting simultaneously under certain operating conditions. This simultaneous conduction, called cross conduction, is equivalent to a short circuit being placed across the high voltage supply and leads to degradation and eventual destruction of the power switching transistors. The operating conditions referred to are those where the power switching transistors are turned on for time durations which are short relative to the overall period of operation; viz., low duty cycle operation. The problem experienced with low duty cycle operation may in some cases be overcome by utilizing an optimized coupling transformer. But even with an optimized coupling transformer, there would be a limit on how far the pulse width could be reduced before cross conduction problems would be experienced.

It is a general object of the present invention to overcome these and other drawbacks of the prior art by providing an improved circuit for coupling control signals into the base of a power switch.

It is a further object of the present invention to provide a circuit for coupling control signals into the base of a power switch and at the same time achieving fast turn off of the power switch.

It is another object of the present invention to provide an improved high frequency switch mode type power supply.

It is still another object of the present invention to provide an improved inverter circuit capable of operating with a very short duty cycle.

It is still a further object of the present invention to provide an improved transformer isolated base drive circuit which provides a polarity insensitive input impedance.

These and other objects, features and advantages of the present invention will become more apparent from the detailed description of the preferred embodiment when read in conjunction with the drawings.

SUMMARY OF THE INVENTION

The above and other objects of the present invention are realized through a transformer coupled base drive circuit which provides an electrically equivalent impedance to the secondary windings of the coupling transformer, irregardless of the voltage polarity applied to the base drive circuit. By equalizing the impedance seen by the coupling transformer irregardless of the voltage polarity applied to the base drive circuit, the effects of the coupling transformer's leakage inductance no longer results in cross conduction with a second base drive circuit also connected to the transformer's secondary windings.

In the preferred embodiment of the present invention, first and second switches on the primary side of a base drive transformer are coupled to corresponding first and second base drive circuits on the secondary side of the transformer, the first and second base drive circuits driving the bases of corresponding first and second bipolar switching transistors, the first and second switching transistors switching the high voltage source applied to a load between a positive and negative value, respectively. A third switch, connected to an extra transformer primary winding, is simultaneously closed whenever either the first or second switch is opened, the third switch's associated circuitry effectively placing a short circuit across the transformer primary so as to minimize the magnetizing current released by the transformer from being coupled to the transformer's secondary windings.

With either of the two transformer secondary windings biased in the forward direction so as to turn on its associated base drive circuit and power switching transistor, current flows through the base-emitter junction of the power switching transistor (which is equivalent to one diode) and through a first capacitor and a first diode. With the transformer secondary reverse biased so as to turn off the power switching transistor, current flows through a second diode, the first capacitor and then through a third diode. Thus each of the two base drive circuits presents the same impedance to the transformer independent of the way it is biased, thus minimizing the possibility of cross conduction between the two base drive circuits.

DETAILED DESCRIPTION OF THE PREFERRED EMBODIMENT

Figure 1:
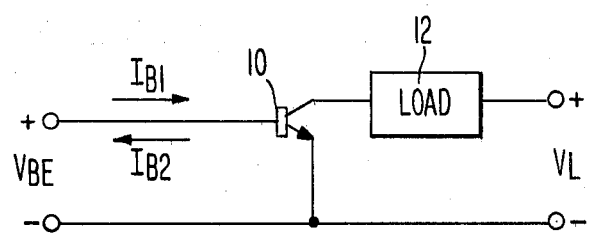
FIG. 1 is a schematic drawing of a bipolar transistor used as an on-off switch.
Figure 2:
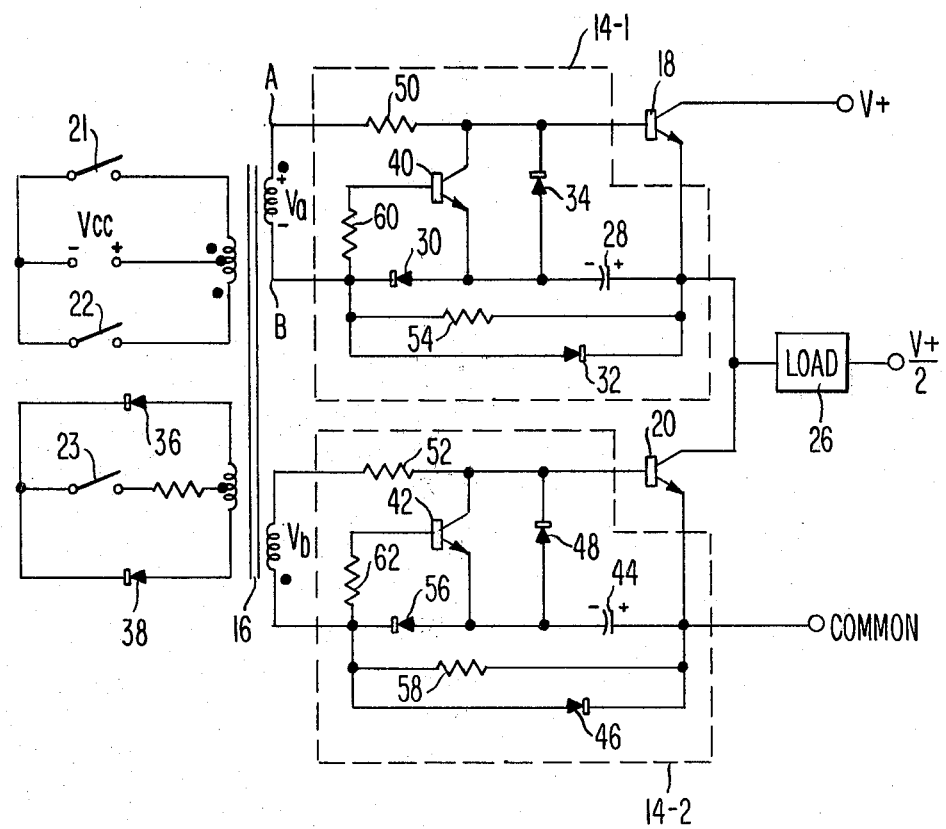
FIG. 2 is a schematic drawing of the base drive circuit of the present invention used in a transformer coupled high frequency power inverter.

As shown in FIG. 2, the base drive (or turn-off) circuits 14-1,2 of the present invention may be used to couple control signals from the primary side of coupling transformer 16 to power switches 18 and 20, respectively, such that the apparatus of FIG. 2 may be utilized as a high frequency power inverter.

As will be obvious to those skilled in the art, transformer 16 is used to couple a low voltage circuit composed of switches 21, 22 and 23 on the primary side of transformer 16 to the circuitry on the secondary side of transformer 16, which in general operates at high voltages. Thus, transformer 16 serves to electrically isolate switches 21, 22, and 23, which typically operate at a dc common voltage level in the area of 20-25 vdc, from the bases of transistors 18 and 20, which are indirectly connected to the high voltage dc power line.

Although shown in FIG. 2 as mechanical switches, those skilled in the art will readily appreciate that transistorized circuitry may be substituted for and to control the switching of switches 21, 22, and 23. Referring now to the timing diagram of FIG. 3, it will be seen that transistors 18 and 20 may be alternately turned on by the action of switches 21 and 22. Further, as transistors 18 and 20 act as switches, the voltage across the load 26 consists of a series of alternating rectangular pulses having peaks of $\frac{1}{2}$ V+ and $-\frac{1}{2}$ V+ volts.

The preferred embodiment of the present invention generally operates at some fixed frequency. For example, a typical frequency of operation could be 20 KHz. For a 20 KHz frequency of operation, each half cycle of the ac-type waveform to be generated is 25 $\mu$sec in duration. Basically then, switch 21 would be closed for at most 25 $\mu$sec to generate the positive half cycle across the load 26. Switch 21 would then be opened and switch 22 would be closed to generate the other half cycle for another 25 $\mu$sec.

A more typical mode of operation would be one where each of the switches 21, 22 is not closed for the full 25 $\mu$sec half cycle and thus the circuit output has a dead time. For example, assuming a 25 $\mu$sec half cycle, the application might call for a positive voltage pulse of 15 $\mu$sec duration to be supplied to the load 26. In such case, switch 21 would be closed for 15 $\mu$sec, then switch 21 would be opened, and switch 23 would be closed for the 10 $\mu$sec dead time.

Switch 23 and its associated circuitry (consisting of the extra primary winding and diodes 36 and 38) is present to partially compensate for the fact that transformer 16 is a non-ideal magnetic device. Thus, when switch 21 is closed there is a magnetizing current in the transformer 16 (since transformer 16 is effectively an inductor and it is being charged up with energy). If switch 23 was not in the inverter circuit and all that was done was to open switch 21, there would be an inductive kick (due to the magnetic field stored in transformer 16) when switch 21 opened that would tend to go to the wrong place; viz, it would tend to turn transistor 20 on or keep transistor 18 on for a longer time than needed. In order to partially prevent the energy stored in transformer 16 from being coupled into the secondary of transformer 16, switch 23 is closed so that the inductive current flowing through transformer 16 will flow through switch 23 and through one of the diodes 36, 38. Although switch 23 and its associated circuitry partially compensates for the inherent limitations of transformer 16, problems due to the leakage inductance of transformer 16 are still present when the circuit is operated at short pulse widths; i.e., switches 21 and 22 closed for very short periods of time relative to the total time available for them to be closed. The present invention is effective to greatly limit the effects of the latter mentioned problem.

Again referring to FIG. 2, when prior art base drive circuits were utilized instead of the base drive circuits 14-1,2 of the present invention, due to the less than perfect characteristics of practical coupling transformers 16, under certain operating conditions both power switching transistors 18 and 20 would conduct simultaneously. This simultaneous conduction causes the equivalent of a short circuit across the high voltage dc supply and leads to the degradation and eventual destruction of transistors 18 and 20. The conditions under which the simultaneous conduction occurs with prior art base drive circuits are those where transistors 18 and 20 are turned on for time durations which are short relative to the overall period of operation; viz., for low duty cycle operation.

Figure 3:
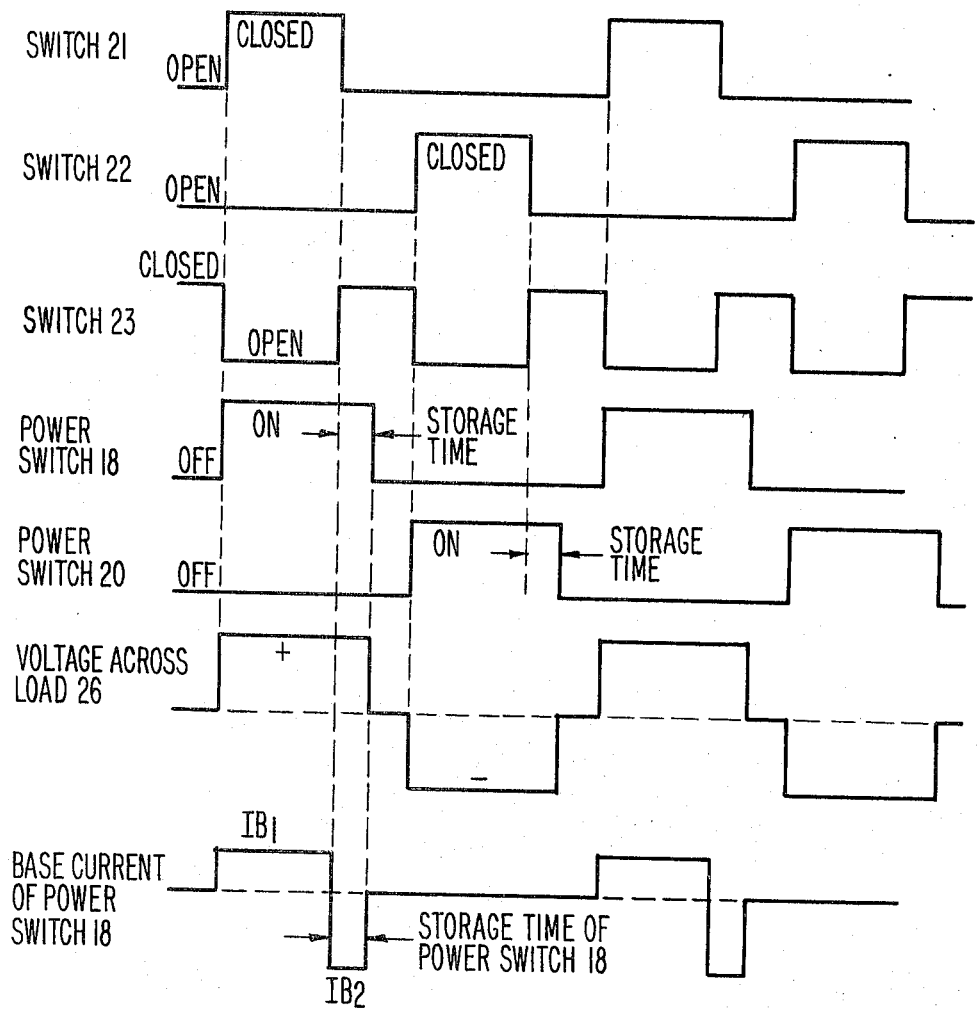
FIG. 3 is a timing diagram showing the operation of the power inverter of FIG. 2.

Referring again to the timing diagram of FIG. 3, with switch 21 closed and switches 22 and 23 both open, $V_a$ has the polarity shown in FIG. 2 and transistor 18 is turned on by base drive current $I_{B1}$. Since $V_a$ and $V_b$ are of opposite polarity, transistor 20 is off. When switch 21 opened, switch 23 is simultaneously closed and effectively places a short circuit across the primary of transformer 16. $V_a$ and $V_b$ do not immediately collapse to zero due to the primary winding being shorted, but instead exhibit over and undershoots because the coupling between the various windings of transformer 16 is imperfect; viz, leakage inductances exist.

The problem that occurs with prior art base drive (or turn-off) circuits utilized in an inverter operated at short duty cycles is due to the impedance of the prior art turn-off networks being polarity dependent. Thus, when utilizing the turn-off networks of the prior art and operating with switches 21 and 22 closed for very short periods of time relative to the total time available for them to be closed, the currents through the leakage inductance of transformer 16 decays to zero eventually, but their flow causes voltage drops to be developed across the secondary windings of transformer 16. Due to the inequality of the leakage inductance currents flowing into the two secondary circuits at the moment switch 21 (or 22) opens, the currents into the two secondary circuits are not equal, this being due to the impedance of the turn-off networks being polarity dependent. Thus, as $V_a$ and $V_b$ have equal magnitude but opposite polarity during each conduction period (i.e., when either switch 21 or switch 22 is closed), the magnitudes of the two secondary currents are unequal. This results in the polarity reversal and cross conduction which has the effect of $V_b$ momentarily reversing polarity and transistor 20 being turned on while transistor 18 has not yet fully turned off.

The turn-off network of the present invention solves this problem of the prior art by providing a turn-off network 14-1,2 with polarity insensitive input impedance. Referring now to FIG. 2 and more particularly to turn off network 14-1, When terminal A is positive with respect to terminal B, current flows through the base-emitter junction of transistor 18 (which is equivalent to one diode) and through capacitor 28 and diode 30. Resistor 54 has only a negligible effect during low duty cycle operation. When terminal A is negative with respect to terminal B, the current flows through the series connection of diode 32, capacitor 28 and diode 34. Thus, the reverse path is electrically equivalent to the forward path. Although reference has only been made to turn-off network 14-1, it will be obvious to those skilled in the art that the operation of turn-off network 14-2 is analogous to that of network 14-1.

A further advantage of the present invention is that capacitors 28 and 44, which are used to reverse bias the base-emitter junction of transistors 18, 20 when each transistor 18,20 is in the OFF state, respectively, are charged for either polarity of secondary voltage. This is beneficial during low duty cycle operation when capacitors 28 and 44 would otherwise discharge during the relatively long OFF state of its respective power switching transistor 18, 20.

In actual use of the preferred embodiment, the sum of the voltage drops across diodes 32 and 34 of base drive circuit 14-1 may not be exactly the same as the sum of the voltage drops across the base-emitter junction of transistor 18 and diode 30 of the other half of base drive circuit 14-1. The resulting mismatch in secondary circuits is normally acceptable insofar as no undesirable polarity reversals occur. However, in those cases where the combination of excessive leakage inductances in transformer 16 and wide variations in $V_{BE}$ of transistors 18, 20 not matched sufficiently by the drop across diodes 46, 32 respectively, would tend to produce polarity reversal and cross-conduction, a still closer matching of the secondary currents may be obtained by the addition of resistors 50, 52 in series with the secondaries of transformer 16. These resistances need not necessarily be discrete components but may, in some cases, consist of the resistance of the secondary windings of transformer 16.

In the preferred embodiment of the present invention, the switching transistors 18 and 20 may be either NPN, PNP or Darlington type high voltage, high speed, high power transistors; viz, they typically handle 300-400 V. between collector and emitter, operated with turn on/-turn off times of less than one $\mu$sec, and can handle collector currents as high as 15 amperes. Should the precise embodiment chosen call for transistors 18 and 20 to be of a Darlington type, such as a TRW SVT6002, in which case two base-emitter junctions are placed in the forward path, impedance matching in the reverse direction can be obtained by using two diodes in series for either diode 32 or 34.

Regarding the other component types utilized in the preferred embodiment of the present invention, switching transistors 40 and 42, which are used to conduct $I_{B2}$ during the storage time of their respective power switches 18, 20, are of the core driver type, are relatively fast, and have collector-emitter voltage and current in the 15–20 volt and one ampere range respectively. Transformer 16 is of the base drive (or coupling) type and is typified by the model PE 62129 manufactured by Pulse Engineering.

Having shown and described the preferred embodiment of the present invention, those skilled in the art will realize that various omissions, substitutions and changes in form and details of the present invention may be made without departing from the spirit of the invention. It is the intention, therefore, to be limited only as indicated by the scope of the following claims.

What is claimed is:

1. A base drive circuit for coupling control signals from a secondary winding of a coupling transformer into the base of a power switching transistor, said base drive circuit comprising:
    a first resistive element connected between the emitter of said power switching transistor and the first end of said secondary winding;
    a first diode connected in parallel with said first resistive element;
    a series combination of a first capacitor and a second diode connected between the emitter and the base of said power switching transistor; and
    a switching transistor, the collector of said switching transistor connected to the second end of said secondary winding and the base of said power switching transistor, the emitter of said switching transistor connected between said second diode and said first capacitor, the emitter of said switching transistor further connected through a third diode to the first end of said secondary winding, the base of said switching transistor connected through a second resistive element to the first end of said secondary winding.

2. The base drive circuit in accordance with claim 1 further characterized in that one side of said first capacitor is directly connected to the emitter of said power switching transistor, the other side of said first capacitor being connected to said second diode.

3. The base drive circuit in accordance with claim 2 further characterized in that:
    the anode of said first diode and the cathode of said third diode are both directly connected to the first end of said secondary winding; and the cathode of said second diode is directly connected to the base of said power switching transistor.

4. The base drive circuit in accordance with claim 3 further characterized in that the positive side of said first capacitor is directly connected to the emitter of said power switching transistor.

5. The base drive circuit in accordance with claim 2 or 4 further including a third resistive element connected between the second end of said secondary winding and the collector of said switching transistor.

6. A high frequency inverter for supplying an ac type voltage to a load, comprising:
   a coupling transformer;
   first switching means, connected to the primary side of said coupling transformer, said first switching means for specifying a first time frame during which a first voltage level is to be applied to said load;
   second switching means, connected to the primary side of said coupling transformer, said second switching means for specifying a second time frame during which a second voltage level is to be applied to said load;
   first power switching means, connected to a first dc voltage level and a first side of said load, said first power switching means for connecting said first dc voltage level to said first side of said load;
   second power switching means, connected to a second dc voltage level and said first side of said load, said second power switching means for connecting said second dc voltage level to said first side of said load;
   wherein each of said first and said second power switching means respectively includes a power switching transistor;
   first turn-off means, connected to a first winding on the secondary side of said coupling transformer and responsive to said first power switching means, said first turn-off means for turning on and off said first power switching means;
   second turn-off means, connected to a second winding on the secondary side of said coupling transformer and responsive to said second power switching means, said second turn-off means for turning on and off said second power switching means; and
   wherein said first and said second turn-off means each includes
   a first resistive element connected between the emitter of its said respective power switching transistor and the first end of its said respective secondary winding,
   a first diode connected in parallel with said first resistive element,
   a series combination of a first capacitor and a second diode connected between the emitter and the base of its said respective power switching transistor, and
   a switching transistor, the collector of said switching transistor connected to the second end of its said respective secondary winding and the base of its said respective power switching transistor, the emitter of said switching transistor connected between said second diode and said first capacitor, the emitter of said switching transistor further connected through a third diode to the first end of its said respective secondary winding, the base of said switching transistor connected through a second resistive element to the first end of its said respective secondary winding.

7. The high frequency power inverter in accordance with claim 6 further including third switching means, connected to the primary side of said coupling transformer, said third switching means for effectively placing a short circuit across the primary side of said coupling transformer.

8. The high frequency power inverter in accordance with claim 6 wherein said first side of said load is connected to the emitter of said first power switching means power transistor and further connected to the collector of said second power switching means power transistor.

9. The high frequency power inverter in accordance with claim 6 or 7 or 8 further characterized in that:
   one side of each of said first capacitors is directly connected to the emitter of its said respective power switching transistor, the other side of each of said first capacitors being connected to its respective second diode;
   the anode of each of said first diodes and the cathode of each of said third diodes are both directly connected to the first end of its said respective secondary winding;
   the cathode of each of said second diodes is directly connected to the base of its said respective power switching transistor.

* * * * *